United States Patent [19]
Kobayashi et al.

[11] Patent Number: 5,973,661
[45] Date of Patent: *Oct. 26, 1999

[54] IMAGE DISPLAY DEVICE WHICH STAGGERS THE SERIAL INPUT DATA ONTO MULTIPLE DRIVE LINES AND EXTENDS THE TIME PER DATA POINT

[75] Inventors: Mamoru Kobayashi; Yasuji Yamazaki; Toru Aoki; Keijiro Naito, all of Suwa, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/575,930

[22] Filed: Dec. 20, 1995

[30] Foreign Application Priority Data

Dec. 20, 1994 [JP] Japan .................................. 6-316988
Nov. 9, 1995 [JP] Japan .................................. 7-291486

[51] Int. Cl.$^6$ ............................................ G09G 3/36
[52] U.S. Cl. .............................. 345/100; 345/94; 345/99
[58] Field of Search .................... 345/94, 95, 98, 345/99, 100, 204, 208

[56] References Cited

U.S. PATENT DOCUMENTS

| | | | |
|---|---|---|---|
| 4,855,724 | 8/1989 | Yang | 345/100 |
| 5,021,774 | 6/1991 | Ohwada et al. | 345/98 |
| 5,170,158 | 12/1992 | Shinya | 345/98 |
| 5,192,945 | 3/1993 | Kusada | 345/100 |
| 5,369,417 | 11/1994 | Tanaka | 345/100 |
| 5,406,304 | 4/1995 | Shirayama | 345/98 |
| 5,657,040 | 8/1997 | Kanbara | 345/98 |
| 5,818,412 | 10/1998 | Maekawa | 345/100 |

FOREIGN PATENT DOCUMENTS 2 681 973  4/1993  France .
59-29295  2/1984  Japan .
6-222737  8/1994  Japan .

Primary Examiner—Jeffery Brier
Assistant Examiner—Paul A. Bell
Attorney, Agent, or Firm—Mark P. Watson

[57] ABSTRACT

An image display device incorporating a specialized phase expansion circuit, a rotation circuit, a sampling device and unique controlling circuitry. The phase expansion circuit includes a plurality of trail buffers or sample holder circuits for receiving a serially applied train of pixel image signals, expanding or extending the assertion cycle time and generating a corresponding plurality of expanded image signal trains in parallel. Preferably, one combination of expanded pixel image signals corresponding to specific position of pixels arranged in matrix in one train is different from another combination of expanded pixel image signals. The rotational circuit includes a plurality of selecting circuits for receiving the manifold trains of expanded pixel image signals generated by the phase expansion circuit. Each selecting circuit preferably selects one of these trains of expanded pixel image signals and generates a corresponding second train of expanded pixel image signals in parallel according to variable combinations specified by the control circuit. The sampling device receives these second trains of expanded pixel image signals, reconstructs and generates image signal for driving pixels. The control circuitry directs the phase expansion circuit to periodically change the pixel column ordering combinations used to generate the first set of expanded image signal trains. As the column ordering combinations vary, the preferred control circuitry may correspondingly instruct the rotation to reorder or decode the received image signal trains into an expanded signal train in a form suitable for sampling image reconstruction and display. Therefore, even if there are variations of characteristics of individual components such as transistors in the phase expansion circuit and such variation affects uniform brightness of each pixel, these differences in characteristics can be dissipated through periodic resequencing. Consequently, a uniform high-resolution image can be displayed and perceived in the display area.

25 Claims, 12 Drawing Sheets

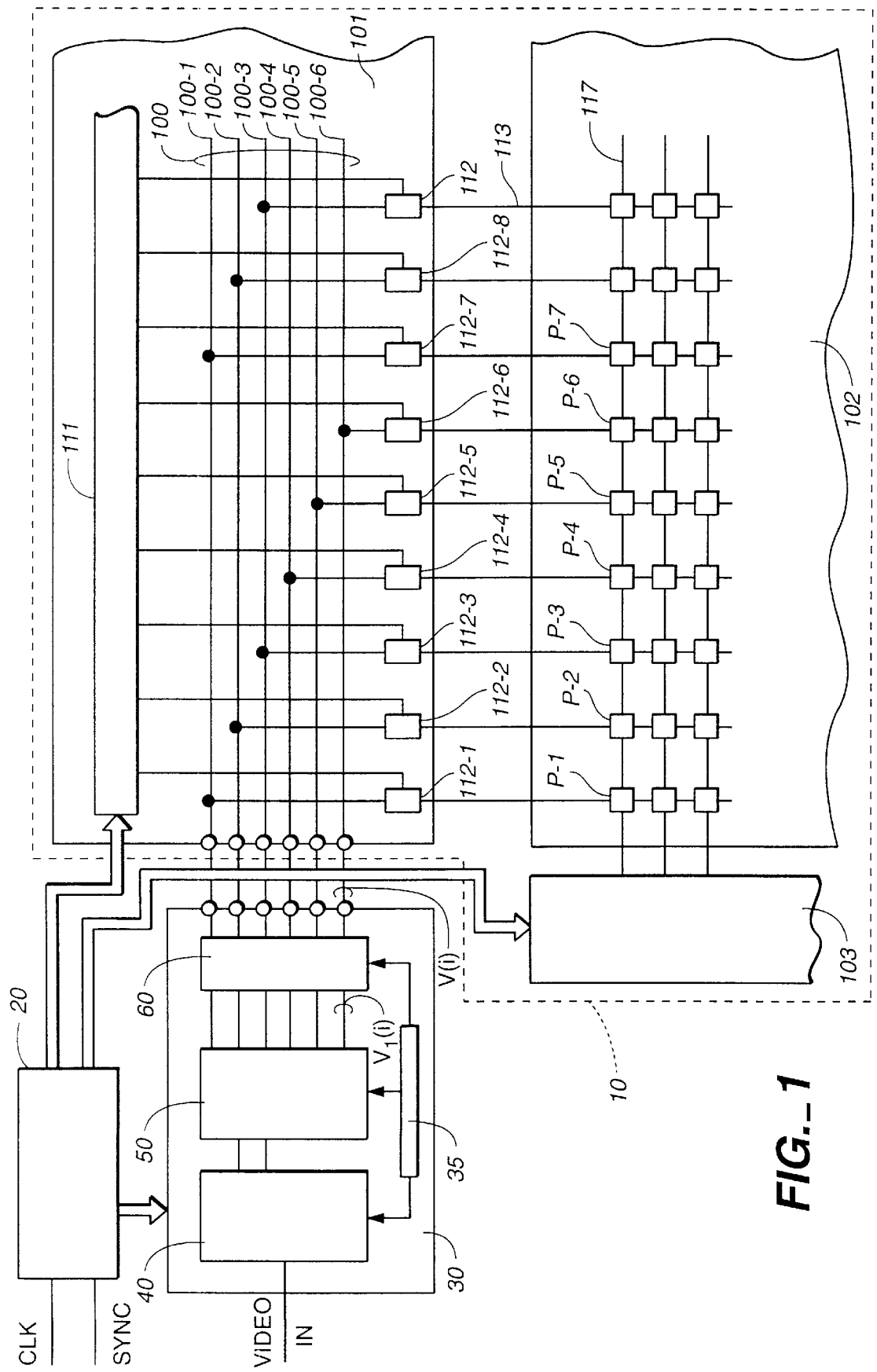
FIG._1

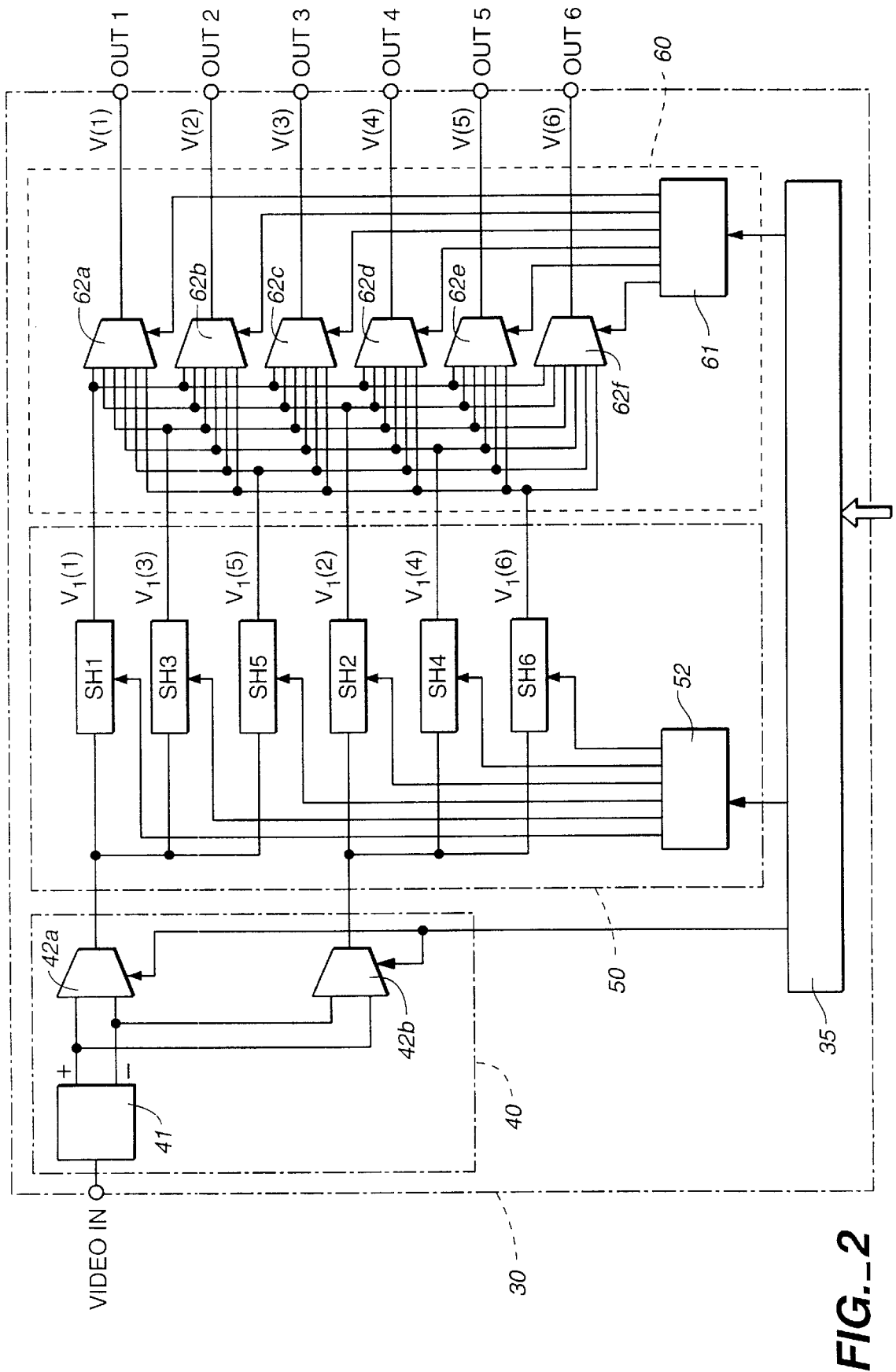
FIG._2

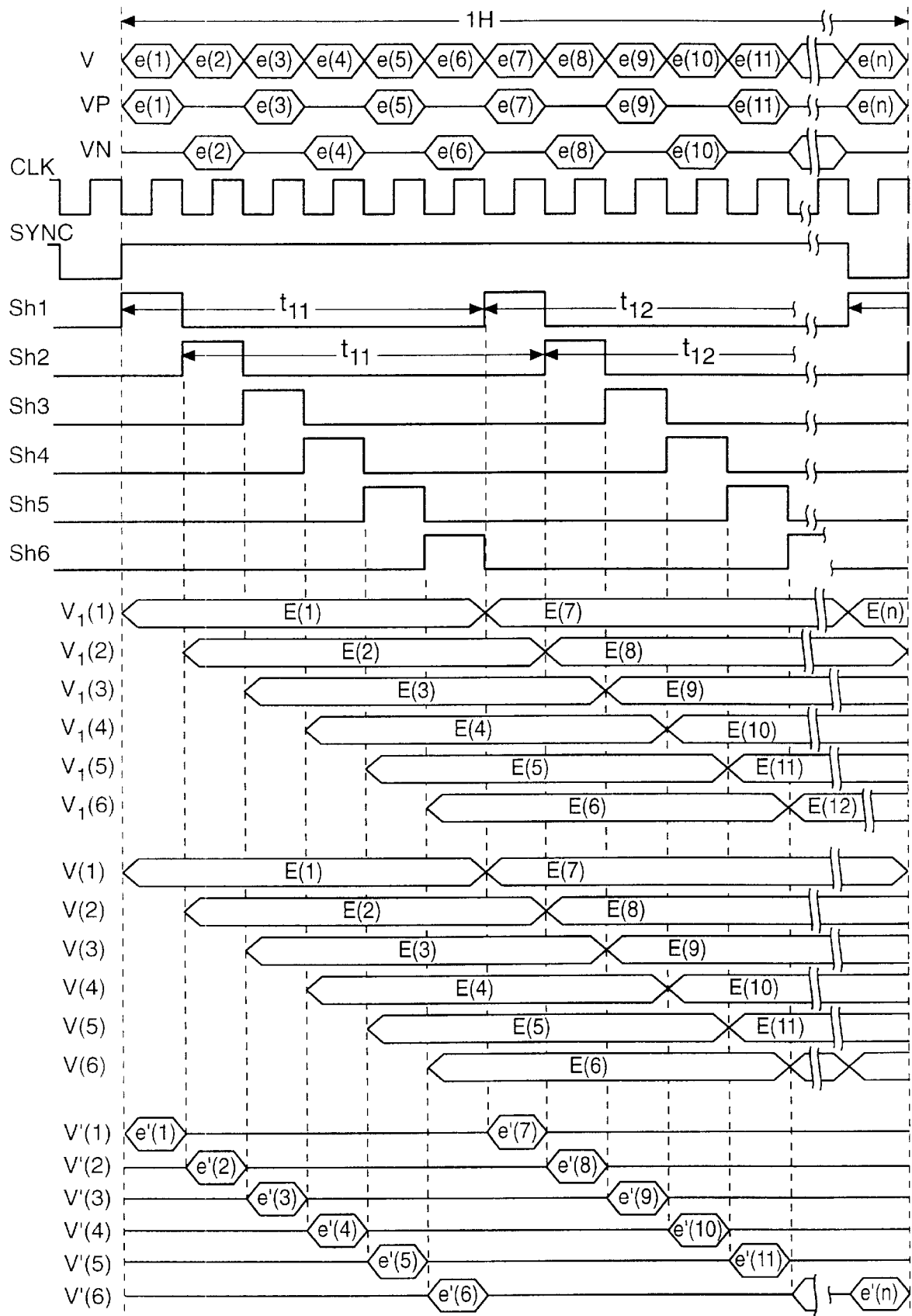
*FIG._3A*

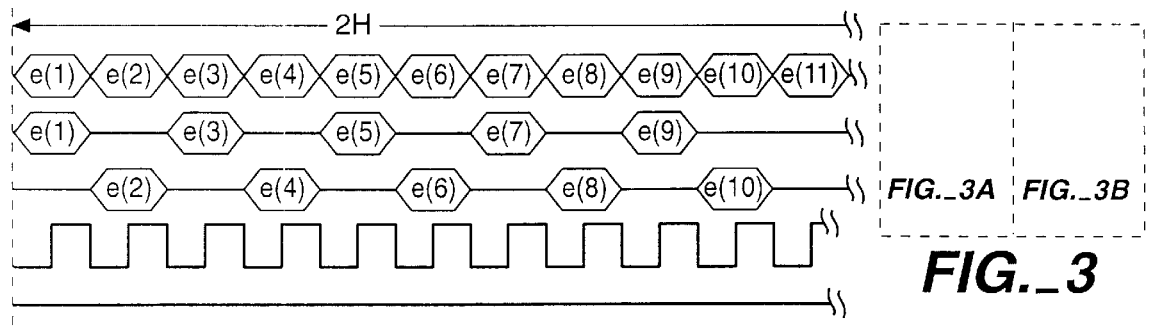
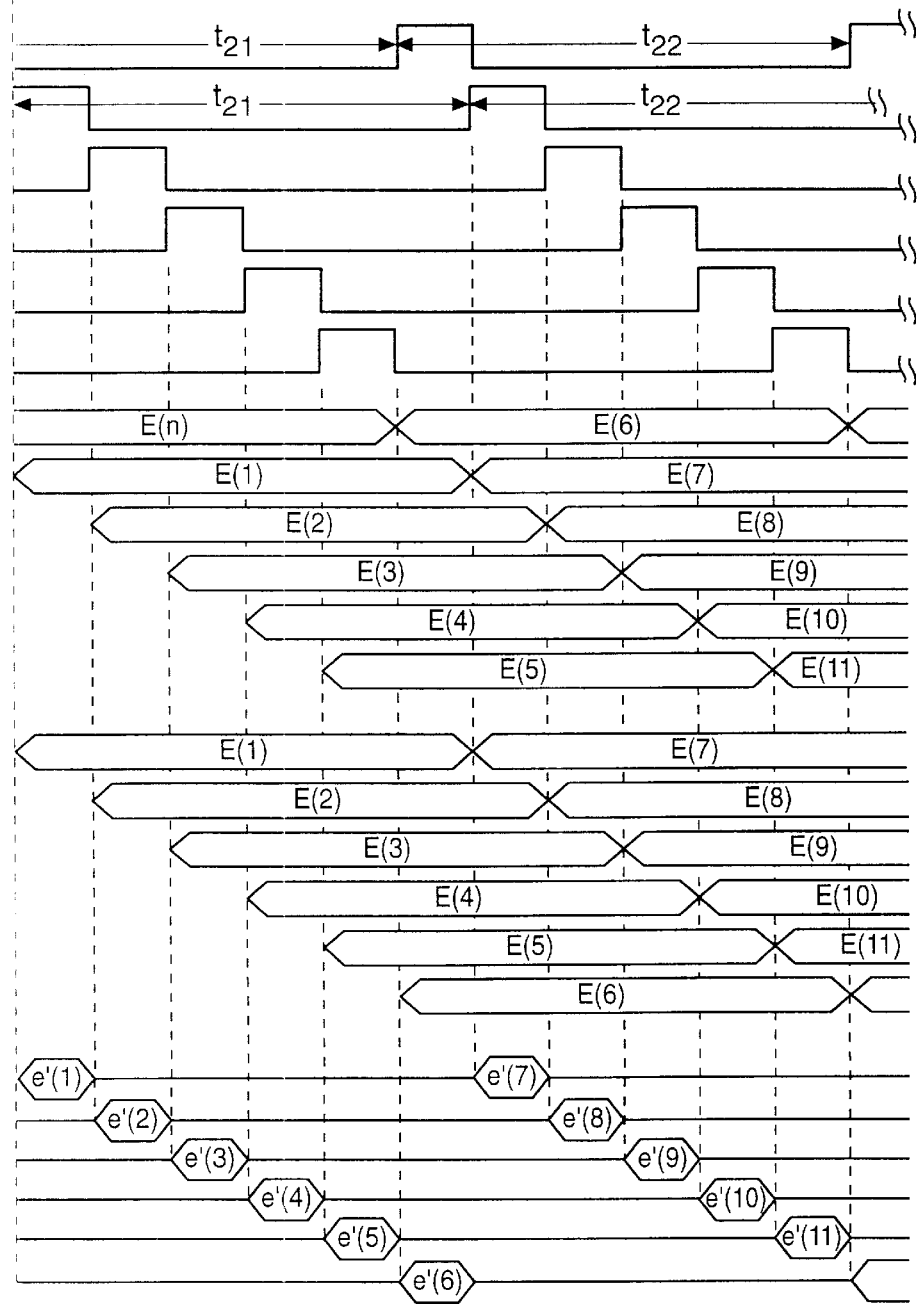
FIG._3B

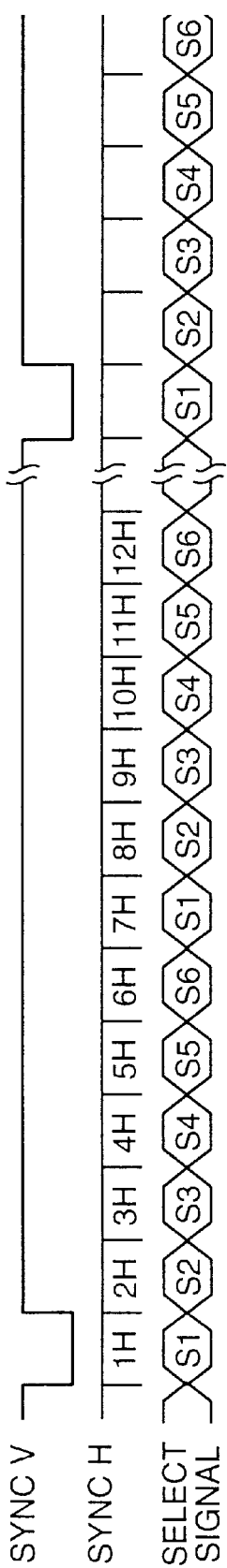
FIG._4
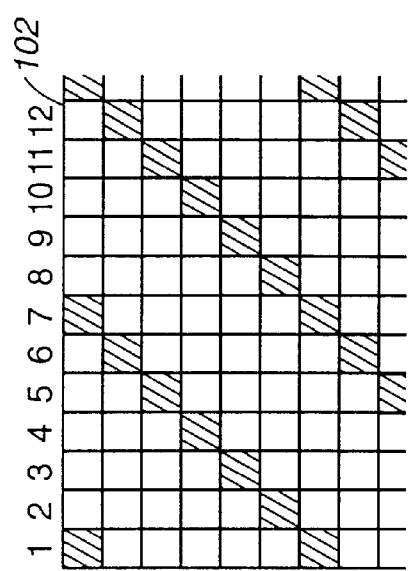
FIG._5

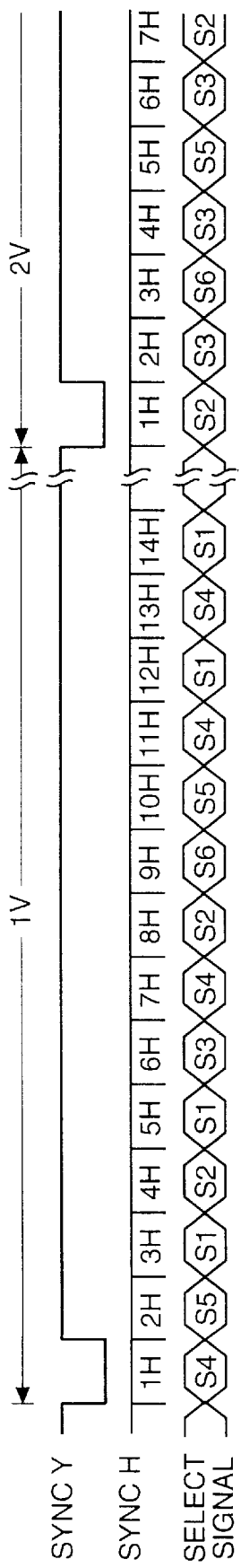
*FIG._6*
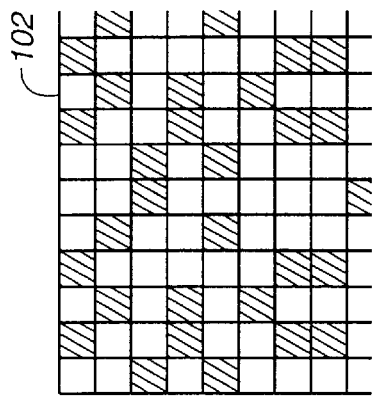
*FIG._7C*
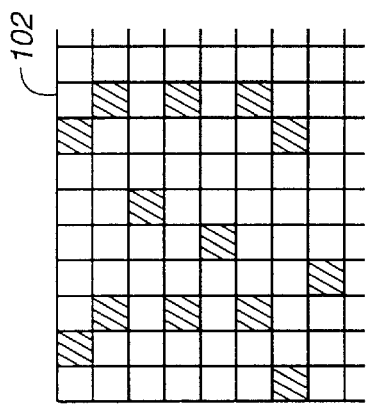
*FIG._7B*
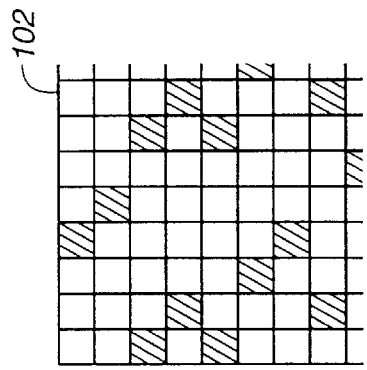
*FIG._7A*

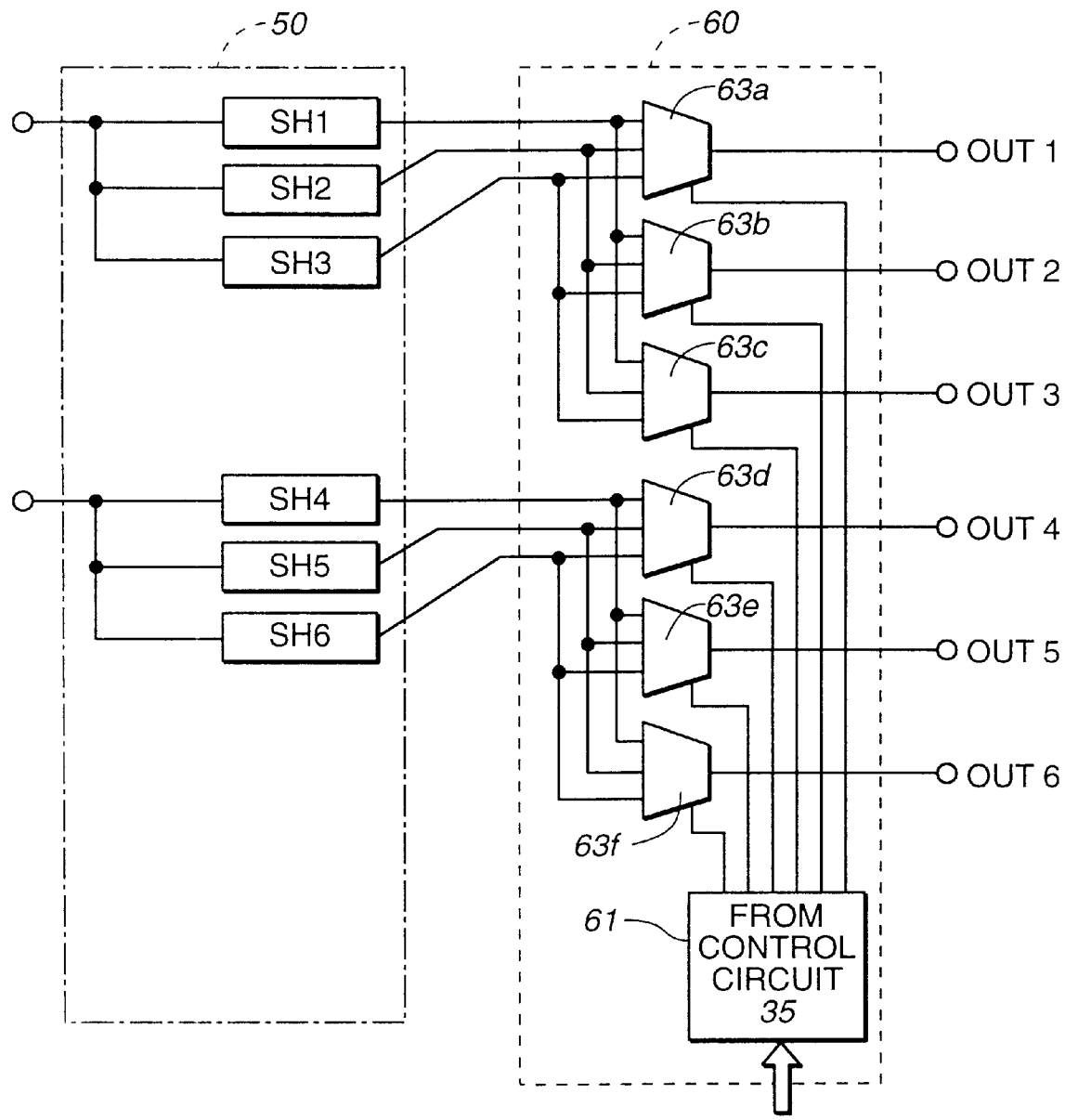
FIG._8

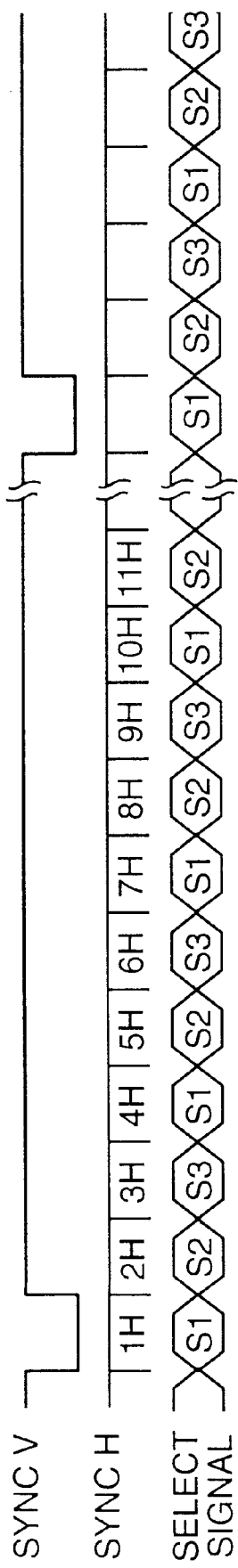
FIG._9
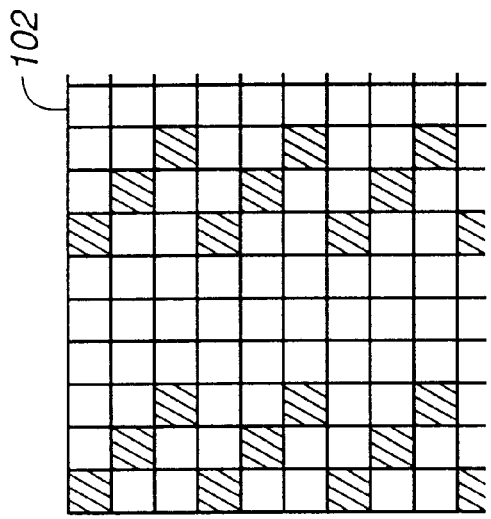
FIG._10

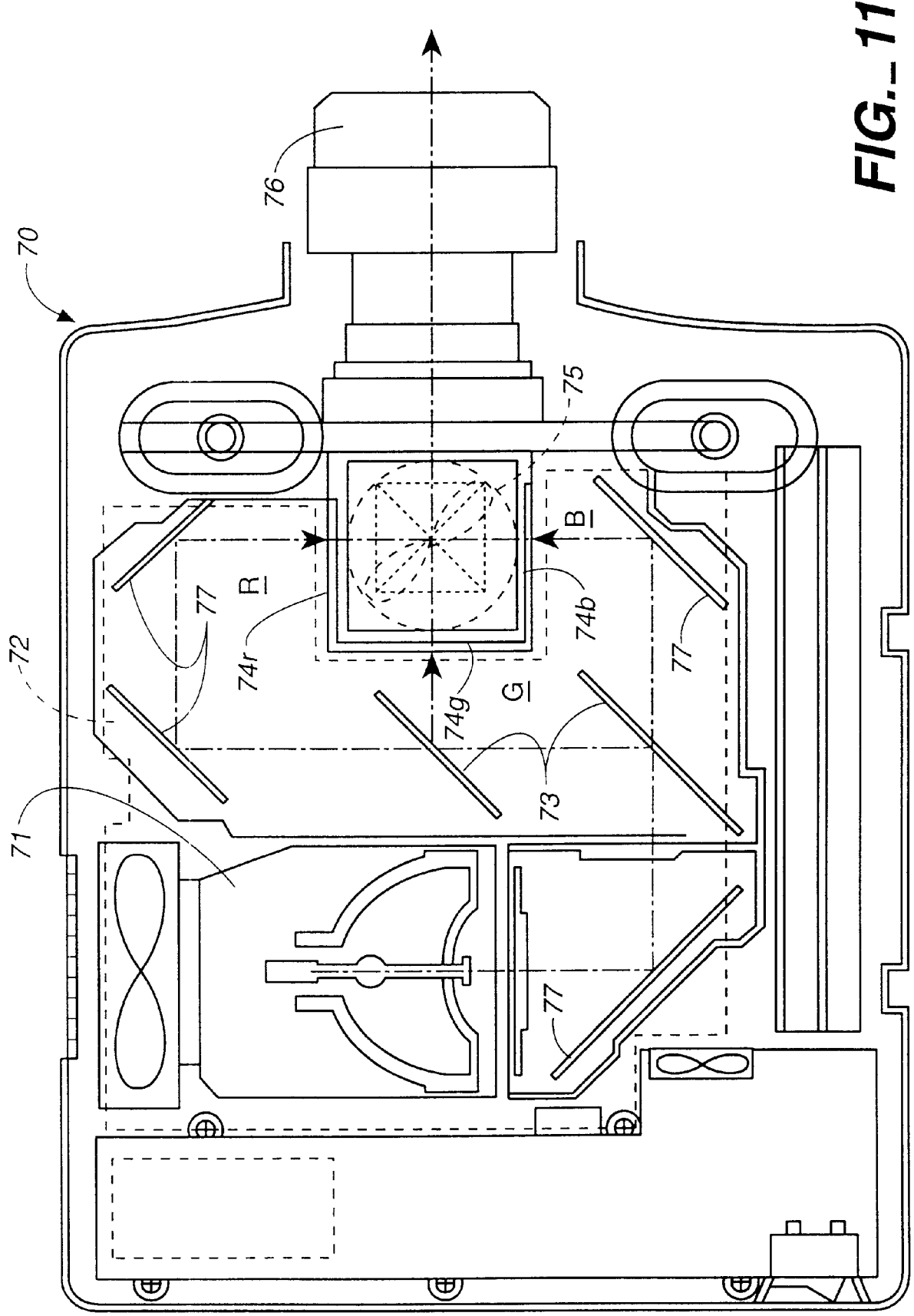
FIG._11

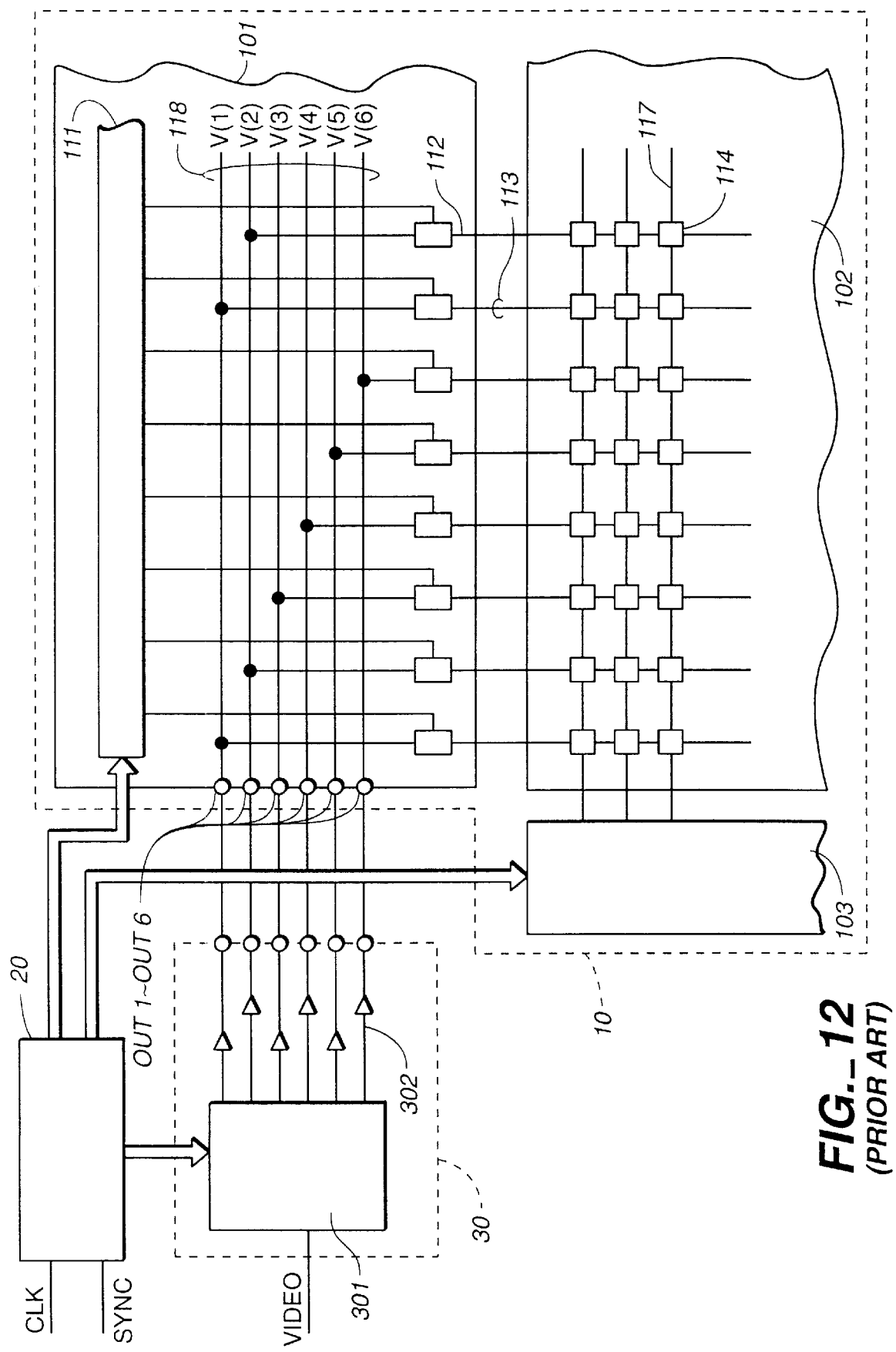
FIG._12
(PRIOR ART)

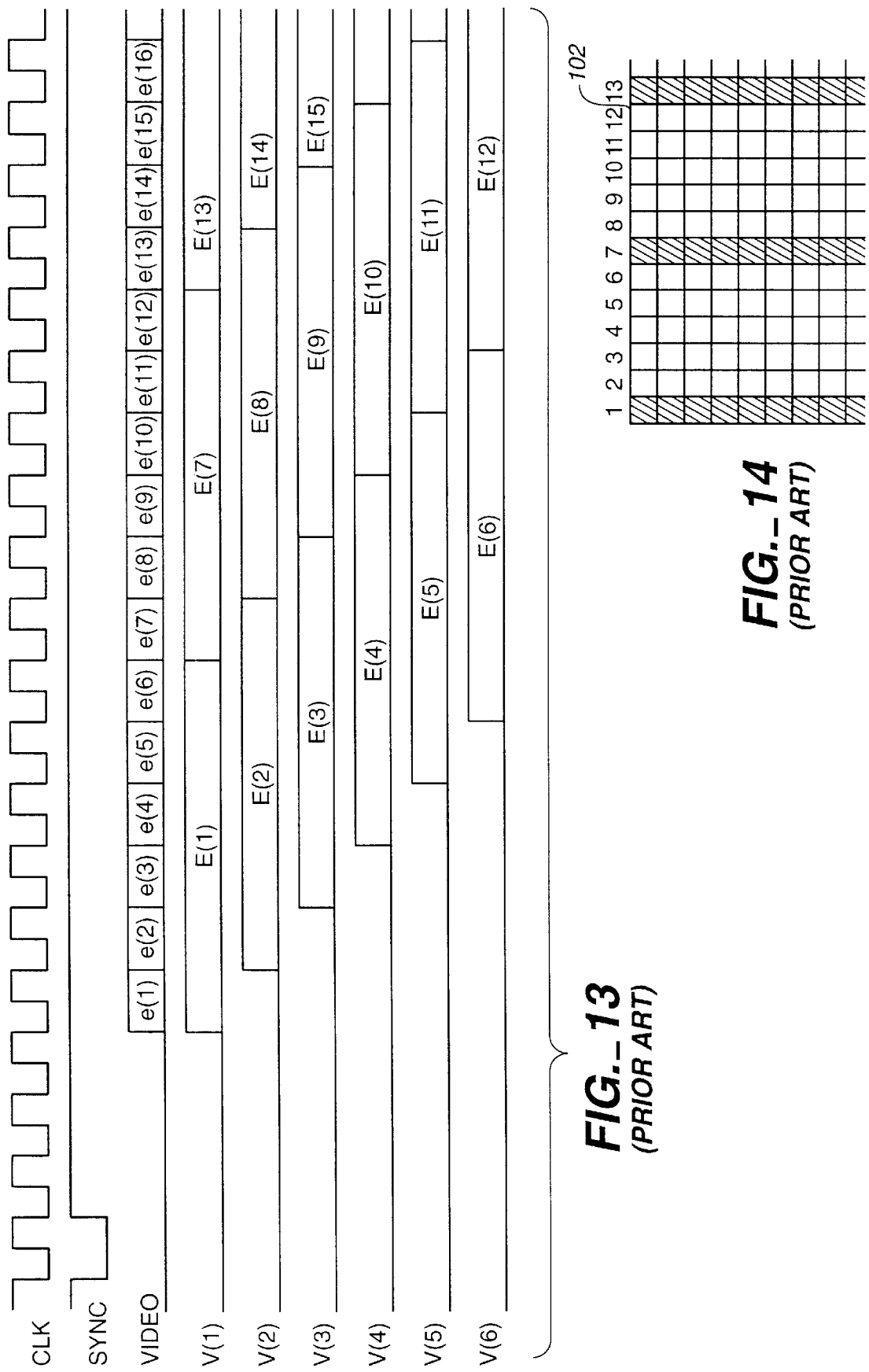
FIG._13
(PRIOR ART)
FIG._14
(PRIOR ART)

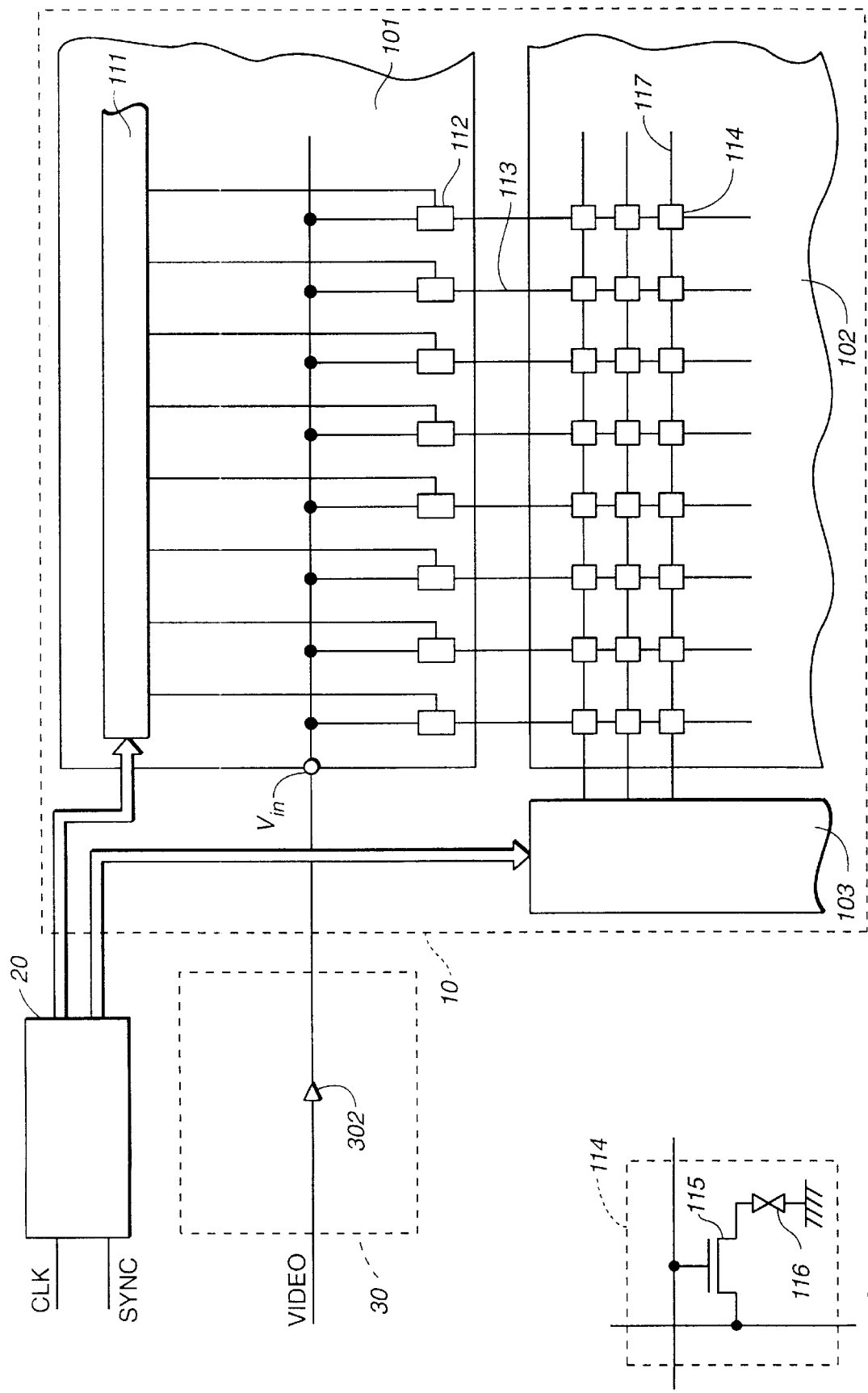
FIG._15A (PRIOR ART)
FIG._15B (PRIOR ART)

IMAGE DISPLAY DEVICE WHICH STAGGERS THE SERIAL INPUT DATA ONTO MULTIPLE DRIVE LINES AND EXTENDS THE TIME PER DATA POINT

BACKGROUND OF THE INVENTION

The present invention relates generally to an image display device, and more particularly to an image display device utilizing a liquid crystal panel.

DESCRIPTION OF THE RELATED ART

Prior art FIG. 15A shows an example of a conventional image display device. This device uses a liquid crystal panel for displaying images, and is provided with liquid crystal panel block 10, timing circuit block 20, and image signal processing circuit 30. Liquid crystal panel block 10 is further provided with image signal drive circuit 101, liquid crystal panel 102, and scanning signal drive circuit 103. In liquid crystal panel 102, a plural of pixel units 114 are arranged at the cross points of column lines 113 and row lines 117 in a matrix. Further, according to FIG. 15B, each pixel unit 114 comprises thin film transistor 115 and pixel 116 having two picture element electrodes which sandwich liquid crystal. Image signal drive circuit 101 is provided with shift register 111 and sampling switches 112. Image signal processing circuit 30 is equipped with amplification and inversion circuit 302.

Here, timing circuit 20 receives source clock signal CLK and horizontal and vertical scanning signal SYNC and distributes control signals to shift register 111 and scanning signal drive circuit 103. On the other hand, Video signal VIDEO is supplied to image signal processing circuit 30 by an external device, such as an image-processing device. This image signal is amplified by amplification and inversion circuit 302 and its voltage level is changed into the voltage required for driving liquid crystal panel 102, with its polarity reversed as necessary, and is output as image signal for driving into input Vin of liquid crystal panel block 10.

Timing circuit block distributes horizontal scanning signals to scanning signal drive circuit 103 during vertical scanning term, namely a single image display term. Horizontal scanning signals from scanning signal drive circuit 103 are sequentially distributed to row lines 117 and turn on thin film transistor 115. During each horizontal scanning term, shift register 111 outputs a sampling signal based on control signal from timing circuit 20 to sampling switches 112. Sampling switches 112 sample image signal corresponding to each pixel 116 and output drive voltage of the image signals to column lines 113 which activates two picture element electrodes in the corresponding pixel 116.

According to this image device, polysilicon thin-film transistors (hereafter referred to as "p-s-i-TFT") are used for thin film transistor 115 formed on a glass substrate of liquid crystal panel 10. But at the same time, it is possible to use p-s-i-TFT to form transistors for both image drive circuit 101 and scanning drive circuit 103, if these transistors are formed on the same glass substrate. Formation of p-s-i-TFT of these circuits 101 and 103 enables further size reduction of image display devices. However, the switching speed of p-s-i-TFT is too slow to accurately process signals in image drive circuit 101 and scanning signal drive circuit 103 using the above described circuitry.

One possible solution to the switching speed problems associated with p-s-i TFT drivers is to expand the phase of input image signal VIDEO for the relationship between the characteristics of sampling switches 112 and the frequency of input image signal VIDEO.

Prior art FIG. 12 shows an example of circuitry of an image display device in which the phase of input image signal VIDEO is expanded to six phases for each pixel signal. Prior art FIG. 13 shows a decomposed signal wave form generated by image signal processing circuit 30 of prior art FIG. 12. Video image signal VIDEO comprises serially applied train of image signals e(1), e(2), e(3), ... e(n), where a given image signal e(k) contains image display information for a pixel unit 114 positioned at column k for the present scanning row incremented by assertion of the horizontal synchronized signal SYNC. Phase expansion circuit 301 in image processing circuit 30 receives image signal VIDEO and expands it into six phases V(1) to V(6). In-line amplifier 302 amplifies these expanded image signals and output them to pins OUT1–OUT6 for distributing these signals to sampling switches 112.

More specifically, the phase expansion circuit 301 in image processing circuit 30 expands or extends the assertion of each image pixel signal e(k) by a factor of 6. As shown more clearly with reference to FIG. 13, if e(k) is asserted for one clock cycle, corresponding image signal E(k) is asserted for 6 clock cycles. To retain proper timing relationships with respect to the original VIDEO signal, 6 parallel expanded image signal lines 118 are used to carry expanded image signal pulse trains V(1)–V(6), respectively. Each expanded pulse train V(i) contains the following sequence upon release of the horizontal synchronized signal SYNC: E(i), E(i+6), E(i+12), ... as shown in FIG. 13 (e.g. V(1)) contains the expanded image signals E(1), E(7) and E(13) in sequence). Moreover, the timing relationships between the expanded pulse trains between the expanded pulse trains is such that for a given V(i), V(i+1) assertion is delayed by 1 clock cycle as shown by this figure. This allows proper reconstruction of the original input image signal VIDEO by sampling and realization of desired image output by pixel unit 114 while lowering the expanded image pulse train V(i) switching frequencies by a factors of 6 as compared to the original input image signal VIDEO.

According to device, however, a p-s-i TFT based phase expansion circuit 301 includes individual phase circuits which may experience operating characteristic variation over time, or during assembly, that might result in gain differences or offsets even if their circuit configurations were meant to be identical. Consequently, even if input image signal VIDEO possesses pixel signals of uniform intensity for example, the resultant intensity of the pixel signals for individual phases might be different after the phase expansion circuit 301. As a result, pixels that should possess the same level of brightness sometimes display different brightness levels on liquid crystal panel 102. Prior art FIG. 14, for example, shows periodic different brightness on a display, in the case when characteristics of individual phase circuit corresponding to pixels image signals e(1), e(7) and e(13) are different from that of other phase circuits, if phase expansion circuit 301 has six individual phase circuits. As a result, every sixth column presents darker line which seems to be confusing, distracting or unpleasant for a viewer.

One possible method of avoiding the gain difference or offset caused by individual circuit variation is to adjust gain difference and offset in the manufacturing process. However, high-precision work for this process is required in relation to matching of the optical characteristics of liquid crystals and such adjustment work becomes more difficult as the number of phase expansions increases. Furthermore, the addition of adjusting devices complicates the circuit configuration. Another possible solution for avoiding such adjustment work is to add high-precision components. However, this approach increases cost, and it is not easy to completely match their characteristics over the entire circuitry by merely increasing component precision.

SUMMARY OF THE INVENTION

It is, therefore, a principal object of this invention to provide an image display device equipped with a phase expansion circuit such as that described above, for providing superior image quality without generating visibly darker sections or lines on each display even if characteristics of each individual phase circuit in phase expansion circuit are different. Another object of this invention is to provide a small-size, high-performance image display device by using a simple circuit to dissipate brightness disparities between pixels caused by the differences between these circuit characteristics or configuration.

In accordance with these and related objects, the present invention comprises a specialized phase expansion circuit, a rotation circuit, a sampling device and unique controlling circuitry. This phase expansion circuit induces at least a plurality of trail buffers or sample holder circuits for receiving a serially applied train of pixel image signals, expanding or extending the assertion cycle time and generating a corresponding plurality of expanded image signal trains in parallel. One combination of expanded pixel image signals corresponding to specific position of pixels arranged in matrix in one train is different from another combination of expanded pixel image signals corresponding to specific position of pixels in another train.

Rotational circuit includes a plural of selecting circuits for receiving plural of the trains of expanded pixel image signals generated by the phase expansion circuit. Each selecting circuit selects one of these trains of expanded pixel image signals and generates a corresponding second train of expanded pixel image signals in parallel according to variable combinations specifically the control circuit. Sampling device receives these second trains of expanded pixel image signals, reconstructs and generates image signal for driving pixels.

The control circuitry directs the phase expansion circuit to periodically change the pixel column ordering combinations used to generate the first set of expanded image signal trains. As the column ordering combinations vary, the preferred control circuitry correspondingly instructs the rotation to reorder or decode the received image signal trains (1st set) into optional expanded signal train (2nd set) form for sampling image reconstruction and display.

Therefore, even if there are variations of characteristics of individual components such as transistors in the phase expansion circuit and such variation affects uniform brightness of each pixel, these differences in characteristics can be dissipated through periodic resequencing. Consequently, a uniform high-resolution image can be displayed and perceived in the display area.

Multiple combinations in the rotation and the phase expansion circuits, and the corresponding expansion sequence can be changed by the control circuit either randomly or according to a certain order. Furthermore, it is also possible to change the combinations and the corresponding expansion sequences, either synchronously with respect to the horizontal synchronization in the display area or with horizontal and vertical scanning terms.

Furthermore, the display area of the image display device could comprise a liquid crystal panel. Alternatively, the display area of the image display device can be a projection-type display having a transmission-type liquid crystal panel and a light source for projection.

Other objects and attainments together with a fuller understanding of the invention will become apparent and appreciated by referring to the following description of specific, preferred embodiments and claims taken in conjunction with the accompanying drawings.

BRIEF DESCRIPTION OF THE DRAWINGS

In the drawings, wherein like reference symbols refer to like parts:

FIG. 1 is a block diagram of the first embodiment of the image display device according to the present invention;

FIG. 2 is a block diagram showing further details of the image processing circuit component of the image display device shown in FIG. 1;

FIGS. 3A and 3B illustrate a sample of control and image signal waveforms used in the image processing circuit described in FIGS. 1 and 2;

FIG. 4 shows the relationship between select signal and horizontal and vertical synchronized signal utilized by the embodiment illustrated in FIGS. 1–3;

FIG. 5 illustrates an example state of darkened pixels in a matrix according to the embodiment shown in FIGS. 1–4;

FIG. 6 shows the relationship between select signal and horizontal and vertical synchronized signal of a second embodiment of the present invention;

FIGS. 7A–7C show states of darkened pixels in a pixel matrix utilizing the second embodiment;

FIG. 8 shows a block diagram of phase expansion and rotation circuits according to a third embodiment of the present invention;

FIG. 9 shows the relationship between select signal and horizontal and vertical synchronized signal of the third embodiment shown FIG. 8;

FIG. 10 shows an example of state of darkened pixels in a matrix of the third embodiment;

FIG. 11 shows a diagram showing an overview of a projector incorporating the system and techniques of the present invention;

Prior art FIG. 12 shows a block diagram of a conventional image display device;

Prior art FIG. 13 illustrates control and image signals used for a display device depicted in FIG. 12;

Prior art FIG. 14 shows the state of darkened pixels in a matrix of the conventional image display device depicted in FIG. 12; and Prior art FIGS. 15A and 15B show a block diagram of another conventional image display device.

DESCRIPTION OF THE PREFERRED EMBODIMENTS

FIG. 1 shows an overall circuit block diagram of a first embodiment of the present invention. This circuit mainly comprises liquid crystal panel 10, timing circuit 20, and image processing circuit 30. Further, liquid crystal panel block 10 includes image signal drive circuit 101, liquid crystal image display area 102, and scanning signal drive circuit 103. Image signal drive circuit 101 includes shift register 111 and several discrete sampling switches 112. Image processing circuit 30 is provided with inversion circuit 40, phase expansion circuit 50, rotation circuit 60 and control circuit 35 to control processing therein. Briefly, FIG. 2 shows details of image processing circuit 30. FIG. 3 illustrates a sample control and image signal waveform used to describe the functionality and relationships of the embodiment shown in FIGS. 1 and 2.

Here, timing circuit block 20 receives source clock signal CLK and horizontal and vertical synchronization signal SYNC and distributes control signals to shift register 111 and scanning signal drive circuit 103. On the other hand, Image signal VIDEO is supplied to image signal processing circuit 30.

Timing circuit block 20 distributes horizontal scanning signals 1H, 2H, 3H . . . to scanning signal drive circuit 103 during one vertical scanning term. Horizontal scaling signals 1H, 2H, 3H . . . are sequentially distributed to row lines 117 and turn on a series of conventional pixel circuits containing thin film transistor 115 in a manner well known in the art. During each horizontal scanning term H, shift register 111 outputs a sampling signal based on control signal from timing circuit block 20 to sampling switches 112. Sampling switches 112 sample image signal corresponding to each pixel unit 114 and output drive voltage of the image signals to column lines 113 which activates a pixel 116 in pixel unit 114. Image signal V comprising a sequential train of pixel image signals e(1), e(2), e(3), . . . e(n) shown in FIG. 3 are distributed to VIDEO IN input of inversion circuit 40.

Referring to FIG. 2, image signal output circuit 41 in inversion circuit 40 generates two kinds of image signals based on input image signal V, i.e., the normal positive polarity signal of input image signal and the negative polarity signals of inverted input image signal and distribute them to two selectors 42a and 42b. Selector 42a selects positive image signal VP and distributes it to phase expansion circuit 50. Selector 42b selects negative image signal VN. These selectors 42a and 42b are controlled by control signal from timing control circuit 35. The main object of generating positive and negative image signals is to avoid deterioration of liquid crystal called as cross talk caused by applying continuos one polarity voltage signal to liquid crystal as well-known in the art.

During 1st horizontal scanning term 1H, positive image signal VP comprising of a train of odd pixel image signals e(1), e(3), e(5), . . . from selector 42a is distributed to sampling holder SH1, SH3 and SH5. Negative image signal VN comprising of a train of even pixel image signals e(2), e(4), e(6), . . . from selector 42b is distributed to sampling holder SH2, SH4 and SH6. Timing control circuit 52 distributes holder clock signals Sh1 to Sh6 to sampling holders SH1 to SH6 respectively based on clock signal CLK and horizontal scanning signal SYNC. The rising edge of these clock signals are synchronized with starting of each pixel image signal in the train. Then, sampling holder SH1 holds pixel image signal e(1) during term $t_{11}$ and pixel image signal e(7) during term $t_{12}$ to generate first expanded image signal $V_1(1)$ comprising a first train of expanded pixel image signals E(1), E(7), E(13). Sampling holder clock signals (rising edge) Sh1–Sh6 are asserted once per term in a progressive single cycle stagger. The raising edge of sampling holder clock signal Sh1 is shifted from that of signal Sh2 by the term of pixel image signal E(1). In the same way, other sampling holders SH3 to SH6 holds pixel image signal of pixel e(3) to e(6) respectively during initial term $t_{11}$ and pixel image signal e(9) to e(12) respectively during second term $t_{12}$ by receiving staggered sample holder clock signal Sh3 to Sh6 to generate first expanded image signal $V_1(3)$ comprising a first train of expanded pixel image signals E(3), E(9), E(15), . . . to $V_1(6)$ comprising a first train of expanded pixel image signals E(6), E(12), E(18).

On the other hand, during 2nd horizontal scanning term 2H, negative image signal VN comprising of a train of even pixel image signals e(2), e(4), e(6) from selector 42a is distributed to sampling holder SH1, SH3 and SH5 and positive image signal VP comprising of a train of odd pixel image signals e(1), e(3), e(5) from selector 42b is distributed to sampling holder SH2, SH4 and SH6. The timing of switching these selectors are preferably controlled by control signals emanating from control circuit 35. Namely, the rising time of holder clock signal Sh1 to Sh6 from control circuit 35 is shifted left by 1 clock cycle compared to that of 1st horizontal scanning term 1H. Therefore, sampling holder SH1 holed pixel image signal e(n) of the last pixel of 1st scanning term during time $t_{21}$ and, during following time $t_{22}$, holds pixel image signal e(6) by receiving sample holder clock signal Sh1. Then, sampling holder SH1 generates first expanded image signal $V_2(1)$ comprising a first train of expanded image pixel signal E(n), E(6), E(12). Further, sampling holder SH2 holds pixel image signal E(1) during time $t_{21}$ and image signal E(7) during time $t_{22}$ by receiving holder clock signal Sh2 to generate first expanded image signal $V_2(2)$ comprising a first train of expanded image pixel signals E(1), E(7), E(13). In the same way, other sampling holder Sh3 to Sh6 hold image signals E(2) to E(5) respectively during initial time $t_{21}$ and image signals E(7) to E(11) during time $t_{22}$ to generate first expanded image signal $V_2(3)$ comprising a first train of expanded image pixel signals E(2), E(8), E(14) to $V_2(6)$ comprising a first train of expanded image pixel signals E(5), E(11), E(17).

The main reason why different image pixel signals are distributed into sampling holders SH1 to SH6 by every different horizontal synchronized term in this embodiment is to avoid repetition unevenness of intensity of image pixel signals caused by effect of circuit character of individual sample holders circuits described in the prior arts and disperse such unevenness in a roughly diagonal manner which is less visible and troublesome in a typical LCD applications.

These first expanded image signal train are distributed to rotational circuit 60. If sample holder SH1 to SH6 are directly connected to signal lines 114 and pixels 116 via output terminal OUT1 to OUT 6 without rotational circuit 60, first expanded image signals are not correctly distributed to each of signal lines 100 and each pixel unit 114. For example, during the term 2H, first expanded image signal $V_2(1)$ is distributed to signal line 100-1 and pixel p-1 and pixel p-7. However, first expanded image signal $V_2(1)$ includes inappropriate expanded pixel image signal E(n) and E(6) which should be distributed to line 100-6 and pixel p-6 and p-n. Therefore, the main function of rotational circuit 60 is to adjust the column order by selecting appropriate first expanded image signals from $V_1(1)$ to $V_1(6)$ and $V_2(1)$ to $V_2(6)$, generate second expanded image signals V(1) to V(6) and supply such second expanded video signals to the appropriate pixel column signal line.

Rotational circuit 60 is provided with rotation control circuit 61, and six 6-input, 1-output analog switches 62a–62f. During 1st horizontal scanning term 1H, switch 62a selects first expanded image signal $V_1(1)$ to distribute second expanded image signal V(1) to output terminal OUT1, 62b selects signal $V_1(2)$ to distribute second signal V(2) to output terminal OUT2, 62c selects signal $V_1(3)$ to distribute signal V(3) to output terminal OUT3, 62d selects signal $V_1(4)$ to distribute signal V(4) to output terminal OUT4, 62e selects signal $V_1(5)$ to distribute signal V(5) to output terminal OUT5 and 62f selects signal $V_1(6)$ to distribute signal V(6) to output terminal OUT6.

On the other hand, during 2nd horizontal scanning term 2H, switch 62a selects first expanded image signal $V_2(2)$ comprising a first train of expanded image pixel signals E(1), E(7), E(13), . . . to distribute second image signal V(1) to output terminal OUT1, 62b selects first image signal $V_2(3)$ of a train of expanded image pixel signals E(2), E(8), . . . to distribute second image signal V(2) to output terminal OUT2, 62c selects signal $V_2(4)$ of a train of expanded image pixel signals E(3), E(9) . . . to distribute signal V(3) to output terminal OUT3, 62d selects $V_2(5)$ of a train of expanded image pixel signals E(4), E(10) . . . to distribute signal V(4) to output terminal OUT4, 62e selects $V_2(6)$ of a train of expanded image pixel signals E(5), E(11) . . . to distribute signal V(5) to output terminal OUT5 and 62f selects signal $V_2(1)$ to distribute signal V(6) to output terminal OUT6.

Further, during 3rd horizontal scanning term 3H, first expanded image signal $V_3(3)$ comprising a train of expanded image pixel signals E(1), E(7) . . . is distributed to output terminal OUT1 as second expanded signal V(1) by switches 62a and so on. Therefore, the relationships between second expanded image signal V(i) (i=1 to 6) be output from analog switches 62a to 62f and first expanded image signal $V_k(i)$ (k=1 to 6: representing the particular horizontal scanning term) to be input to analog switches are shown in the following tables:

TABLE 1

| Scanning term | Second image signal V(i) | | | | | |
| --- | --- | --- | --- | --- | --- | --- |
| | V(1) | V(2) | V(3) | V(4) | V(5) | V(6) |
| 1H(S1) | $V_1(1)$ | $V_1(2)$ | $V_1(3)$ | $V_1(4)$ | $V_1(5)$ | $V_1(6)$ |
| 2H(S2) | $V_2(2)$ | $V_2(3)$ | $V_2(4)$ | $V_2(5)$ | $V_2(6)$ | $V_2(1)$ |
| 3H(S3) | $V_3(3)$ | $V_3(4)$ | $V_3(5)$ | $V_3(6)$ | $V_3(1)$ | $V_3(2)$ |
| 4H(S4) | $V_4(4)$ | $V_4(5)$ | $V_4(6)$ | $V_4(1)$ | $V_4(2)$ | $V_4(3)$ |
| 5H(S5) | $V_5(5)$ | $V_5(6)$ | $V_5(1)$ | $V_5(2)$ | $V_5(3)$ | $V_5(4)$ |
| 6H(S6) | $V_6(6)$ | $V_6(1)$ | $V_6(2)$ | $V_6(3)$ | $V_6(4)$ | $V_6(5)$ |

According to the above table, in order to get second image signal V(1) to V(6) from switches 62a to 62f and distribute them to OUT1 to OUT6 respectively in parallel, there needs first image signals $V_1(1)$ to $V_1(6)$ during first scanning term 1H which is input to these switches in parallel. But, during second scanning term 2H, first image signals $V_2(2)$, $V_2(3)$ . . . $V_2(1)$ are distributed to OUT1 to OUT6 as above order and so on. S1 to S6 stand for select signals which make analog switches 62a to 62f to select the above combination of first image signal train $V_k(i)$ during each horizontal scanning term H.

Rotational control circuit 61 holds select signals S1 to S6 and provides one of select signals to analog switches 62a to 62f during each horizontal term. For example, during term 1H, select signal S1 is supplied to analog switches SH1 to SH6. Based on this select signal, each of analog switches selects one of first expanded image signals $V_k(i)$ and distributes second expanded image signal V(i) to each output terminal OUT(i) based on above combination table.

FIG. 4 shows how select signals S1 to S6 from rotation control circuit 61 to be arranged for further continuous horizontal scanning terms. In this figure, the select signal changes from S1 through S6 synchronously with horizontal scanning signals SYNC. A rotation control circuit 61 generating such select signals may conveniently include a counter circuit, etc. as is well known in the art.

Output terminals OUT1 to OUT6 are connected to image data lines 100-1 to 100-6 and sampling switches 112-1 to 112-6 respectively shown in FIG. 1. Sampling switches 112-7 to 112-n (n:numbers of pixel columns) are also connected to image data lines 100-1 to 100-6. Therefore, sampling switches 112-1 to 112-6 pick second image signal train V(1) to V(6) based on timing signals which are similar to sample holder signals Sh1 to Sh6 from shift register 111. Sampling switches 112-1 to 112-6 supply image signals V'(1) to V'(6) for driving each pixel units p-1 to p-6 in display area 102. Image signal V'(1) for driving comprises pixel image signal e'(1), e'(7), e'(13) and so on shown in FIG. 3. When a horizontal scanning signal SYNC is supplied to a gate of thin film transistor 115 via scanning control circuit 103, thin film transistor 115 is switched to ON to accept image signals to be supplied to electrodes of pixels p-1 to p-6.

FIG. 5 shows a sample of dissipated darkened pixels based on above the first embodiment described wherein above. If expanded image signal V1 generated from sample holder SH1 is always dark comparing with other image signals because of uneven characters of transistors in sample holder SH1, a pattern of distribution of darkened pixels based on image signal V1 comes to be the state shown in FIG. 5. Therefore, undesirable darkened lines of vertical direction shown in prior art recognized for a viewer can be avoided.

Furthermore, in rotation circuit 60, it is also possible to randomly change the select signals S1 to S6 supplied to analog switches 62a–62f synchronously with horizontal scanning term $H_k$. FIG. 6 shows that select signals S1–S6 generated from rotation control circuit 61 can be randomized as will be described hereinbelow with reference to the second embodiment. The second embodiment utilizes identical hardware as illustrated in FIGS. 1 and 2 described hereinabove. In this embodiment as shown in FIG. 6, select signal S4 is supplied to analog switches 62a to 62f from control circuit 61 during the first horizontal term 1H. Select signal S5 is supplied to analog switches 62a to 62f from control circuit 61 during the second horizontal term 2H and so on. In each select signal Si, there are specific combinations of first expanded image signal $V_i(k)$ with second expanded image signal V(k) based on the above table 1. But, the relationships between select signal Si and horizontal scanning term Hk are randomized. In this embodiment, if expanded image signal V(1) generated from sample holder SH1 is always dark comparing with other image signals, a pattern of dissipated darkened pixels shown in FIGS. 7-A to 7-C is generated. Namely, if timing of selecting signal S1 to S6 is randomized like the state shown in FIG. 6 during 1st vertical scanning term 1V, the pattern of darkened pixels during this term comes to be the state like FIG. 7-A. Further, if randomizing order is changed during next 2nd vertical scanning term 2V as shown in FIG. 6, the pattern of darkened pixels during this term comes to be the state like FIG. 7-B. Therefore, total integration of these pattern after this terms comes to be the state like FIG. 7-C. Namely, if randomizing order is changed during every vertical synchronized term, integration of these patterns is performed over time and the entire liquid crystal panel appears to possess nearly the same level of brightness. In other words, the effects of the differences in the characteristics of amplification, inversion, etc. of sample holders SH1 to SH6 for individual phases are dissipated and uniformalized both in terms of space and time. Therefore, we can obtain significantly improved image quality for the liquid crystal panel.

FIG. 8 shows a third embodiment with respect to another phase expansion circuit 50 and rotation circuit 60. Otherwise, the circuitry for this embodiment is equivalent to that discussed in relation to embodiments 1 and 2 hereinabove. Especially, rotation circuit 60 uses n numbers of m-input (m is an integer smaller than n and is set to 3 in this case) and 1-output analog switches 63a–63f. Each one of analog switches 63a–63c selects one signal out of first expanded image signals $V_1(1)$–$V_1(3)$ during first scanning term 1H held by first to third sample holders 51a–51c of phase expansion circuit 50 and generates second image signal of V(1)–V(3) to output terminals OUT1–OUT3. Control circuit 61 supplies select signal S1 to S3 to analog switches 63a to 63f to select one signal out of first expanded image signals $V_1(1)$–$V_1(3)$. Further, each one of analog switches 63d–63f selects one signal out of first expanded image signals $V_1(4)$–$V_1(6)$ held by fourth to fifth sample holders 51d–51f and generates second image signals of V(4)–V(6) to output terminals OUT4–OUT6.

In this embodiment, three types of select signals S1 to S3 are used instead of six selects signals used in the first embodiment. Therefore, if further continuos horizontal scanning terms are considered, the relationships between second expanded image signal V(i) (i=1 to 6) be output from analog switches 63a to 63f andfirst expanded image signal $V_k(i)$ (k=1 to 6) to be input to analog switches for further each horizontal scanning term 1H to 6H can be described with reference to the following table:

TABLE 2

| Scanning term | Second image signal V(i) | | | | | |
|---|---|---|---|---|---|---|
| | V(1) | V(2) | V(3) | V(4) | V(5) | V(6) |
| 1H(S1) | $V_1(1)$ | $V_1(2)$ | $V_1(3)$ | $V_1(4)$ | $V_1(5)$ | $V_1(6)$ |
| 2H(S2) | $V_2(2)$ | $V_2(3)$ | $V_2(4)$ | $V_2(5)$ | $V_2(6)$ | $V_2(1)$ |
| 3H(S3) | $V_3(3)$ | $V_3(4)$ | $V_3(5)$ | $V_3(6)$ | $V_3(1)$ | $V_3(2)$ |
| 4H(S1) | $V_4(1)$ | $V_4(2)$ | $V_4(3)$ | $V_4(4)$ | $V_4(5)$ | $V_4(6)$ |
| 5H(S2) | $V_5(2)$ | $V_5(3)$ | $V_5(4)$ | $V_5(5)$ | $V_5(6)$ | $V_5(1)$ |
| 6H(S3) | $V_6(3)$ | $V_6(4)$ | $V_6(5)$ | $V_6(6)$ | $V_6(1)$ | $V_6(2)$ |

FIG. 9 shows how select signals S1 to S3 from rotation control circuit 61 to be arranged for further continuous horizontal scanning terms. In this figure, select signals S1 to S3 are changed synchronously with horizontal scanning signal SYNCH.

FIG. 10 shows distribution of dissipated darkened pixels based on above embodiment. If expanded image signal V1 generated from sample holder SH1 is always dark comparing with other image signals because of uneven characters of transistors in sample holder SH1 which differs from other sample holders, a pattern of distribution of darkened pixels comes to be the state shown in FIG. 10. Therefore, darkened lines toward vertical directions shown in prior art can be avoided. Namely, pixels with different brightness levels are dispersed over liquid crystal panel 102 and thus do not appear as serious visual vertical line defects, producing improved image quality.

According to this embodiment, numbers of inputs to analog switches 63a to 63f can be reduced comparing numbers of outputs from these switches. Therefore, circuits construction can be simplified and it comes to be easy to design and assemble such circuitry and is therefore especially preferred, when manufacturing costs are prime concern.

Furthermore, it is also possible to randomly change select signals S1–S3 in rotation circuit 60 which utilizes 3-input, 1-output analog switches 63a–63f. Random changes of select signals not only spatially disperse the pixels with different brightness levels caused by the gain differences stemming from amplification, inversion, etc., over liquid crystal panel 102, but also change their positions for each display image generated during a single horizontal scanning cycle. Therefore, when integration is performed over time, the effects of the differences in the characteristics of amplification, inversion, etc. of sample holders are dissipated, resulting in higher-quality images.

The application of the invention is of course, not limited to above embodiments. For example, instead of changing the select signals completely at random, it is possible to change their sequence based on the vertical synchronized signal of the image signal, or to change them randomly based on the vertical scanning term. These changes can disperse, both in terms of space and time, the effect of the difference in circuit characteristics that will appear when a circuit such as a sample hold circuit is used for phase expansion, thus dissipating the effects of circuits on image display and producing high-quality, high-resolution images.

Furthermore, the relationship between select signals S1–S6 or S1–S3 and the combinations of first expanded image signals $V_k(i)$ and second image signals V(i) need not be as described in Tables 1 and 2; and many other types of circuits besides those described above can be used for the circuit for generating and supplying select signals.

According to above embodiments, differences might occur in the offset between the input and output of the analog switches 62a to 62f inside the rotation circuit 60, in addition to a phase expansion circuit 50. However, these differences are generally much smaller than those of image signal holding circuits SH1 to SH6 or the amplification and inversion circuit in phase expansion circuit 50. Therefore, the installation of a rotation circuit has no substantial effects to the voltage differences among second image signals V(i) (i.e., pixel brightness differences on liquid crystal panel 102), thus fully producing the image quality improvement effects of rotation. Furthermore, the use of a rotation circuit simplifies the inversion of pixel of image signal performed by inversion circuit 40, and pixel signals with a stable DC level can be provided because the polarity needs to be inverted only for each vertical synchronization signal. Consequently, the signal offset is reduced and horizontal cross-talk can be prevented, producing a clearer image.

Additionally, rotational circuit 60 or the entire data processing circuit block including rotational circuit 60 can be formed on a distinctive substrate outside of the liquid crystal panel, and can be integrated into an IC. In particular, when integrating the circuit into an IC, the use of rotational circuit 60 of the invention eliminates the level adjustments between signal-processing circuits required during phase expansion. Furthermore, IC integration is easy since high-resolution images can be achieved even if some level differences exist among phase expansion circuit 50 during the integration of these circuits into an IC.

When forming these circuits on a single substrate, it is possible to adjust the gain differences and offsets of the circuits during manufacturing processes, in order to avoid the gain differences or offsets that would be caused by component variation. However, because high-precision work is required for matching the gains and offsets with the optical characteristics of liquid crystals, such adjustment work becomes impractical as the number of phase expansions increases. Furthermore, the addition of adjusting devices complicates the circuit configuration. In contrast, the use of a rotation circuit, such as that used in the image display device in this example, eliminates the need for adjustment work and high-precision components, and thus can reduce costs and achieve better display images than possible with higher precision components.

FIG. 10 shows an overview of a projection-type image display device called as projector that uses an optical system based on three prisms. In projector 70, the light projected from white light source lamp unit 71 is divided into the three primary colors R, G, and B by multiple mirrors 77 and two dichroic mirrors 73 inside light guide 72; and then these three colors are guided to three TFT liquid crystal panels 74r, 74g, and 74b each of which displays one of the three colors. The light modulated by three TFT liquid crystal panels 74r, 74g, and 74b is input into dichroic prism 75 from three directions. R and B lights are bent by 90° by dichroic prism 75 while G light advances straight, and as a result, images of individual colors are synthesized and a color image is projected onto an object, such as a screen, via projection lens 76. When input image signals VIDEO are supplied to each of liquid crystal panels 74r, 74g, and 74b via a data-processing circuit block provided with the phase-expansion function and the rotation function that are related to the invention, images in individual colors with high quality and high resolution and without horizontal cross-talk or vertical line irregularities can be created by liquid crystal panels 74r, 74g, and 74b. Therefore, projector 70 can be used to project large crisp images onto an object such as a screen.

According to the image display device of the invention, high-resolution images can be obtained by expanding the phases of image signals; and furthermore, high-quality images can be obtained by rotating the phase-expanded image signals and supplying them to the display area, thus preventing vertical line irregularities caused by the phase expansion. Furthermore, because the rotation simplifies the inversion of the polarity of every other pixel, horizontal cross-talk can be prevented.

Furthermore, differences in characteristics, such as level differences of amplification or inversion in sample holder circuits, etc., used for phase expansion, can be tolerated; and the differences in image signals for drive caused by these differences in characteristics can be dispersed over the display area in terms of space and time by a rotation circuit which switches the combination of the image signal that is phase-expanded immediately before the display area and the panel drive image signal. The image display device of the present invention eliminates the level adjustments between signal-processing circuits required during phase expansion, and thus can reduce the work and cost required for circuit design and assembly. Therefore, a small, inexpensive, high-resolution, and high-quality image display device can be provided.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An image display device having a plurality of pixels spatially arranged in a matrix, comprising:
   phase expansion means comprising a plurality of sample holder circuits for:
      receiving a serial train of pixel image signals;
      phase-expanding the received pixel image signals; and
      generating one of:
         a first staggered sequence of phase-expanded image signals during a first time period; and
         a second staggered sequence of phase-expanded image signals during a second time period;
      rotational means in communication with said phase expansion means and comprising a plurality of selection means in parallel for:
         receiving one of the first and second staggered sequences during a given time period comprising one of the first and second time periods; and
         selectively reordering the received staggered sequence and generating a corresponding third staggered sequence based on the given time period;
      sampling means in communication with said rotational means for receiving the third staggered sequence, generating appropriate pixel driving signals in response thereto, and transferring the pixel driving signals to said pixel matrix; and
      control means in communication with said phase expansion and rotational means for selecting the given time period and instructing the rotational means to reorder the received staggered sequence based on the given time period.

2. The image display of claim 1, wherein said control means selects the given time period according to a progressive circular succession of staggered sequences.

3. The image display of claim 1, wherein said control means selects the given time period according to a random circular succession of staggered sequences.

4. The image display of claim 1, wherein the control means selects the given time period according to horizontal synchronization of a display including said pixel matrix.

5. The image display of claim 1, wherein the control means selects the given time period according to horizontal and vertical synchronization of a display including said pixel matrix.

6. The image display device of claim 1, wherein said control means transmits plural sets of selection signals in parallel to said selection means of said rotational means with respect to the given time period.

7. The image display device of claim 6, wherein each of said selection means of said rotational means comprises an analog switch in communication with at least one sample holder circuit of said phase expansion means to selectively couple one of said sample holder circuits to an input line of said sampling means responsive to said selection signals transmitted by said control means.

8. The image display device of claim 6, wherein each of said selection means of said rotational means comprises an analog switch in communication with each sample holder circuit of said phase expansion means to selectively couple one of said sample holder circuits to an input line of said sampling means responsive to said selection signals transmitted by said control means.

9. The image display device of claim 1, wherein said rotational means and said phase-expansion means comprises appropriate combinations of thin film transistors.

10. The image display of claim 1, wherein said pixel matrix is imbedded in a display area of a liquid crystal panel; and wherein a given pixel within said pixel matrix comprises a thin film transistor and two picture element electrodes sandwiching liquid crystal.

11. The image display device of claim 1, wherein said pixel matrix is disposed on a projection-type display means provided with a transmission-type liquid crystal panel and a light source for projection, and wherein said sampling means supplies said pixel driving signals to a data-side drive area of said transmission-type liquid crystal panel.

12. The image display device of claim 1, wherein the first and third staggered sequences are equal.

13. The image display device of claim 1, wherein the first and second staggered sequences are different.

14. An image display device comprising:
a plurality of pixel units spatially arranged in a matrix;
an inversion circuit that receives a serial train of pixel image signals and outputs a serial train of positive pixel image signals and a serial train of negative pixel image signals;
a phase expansion circuit comprising:
a plurality of odd sampling holder circuits that receive said serial train of positive pixel image signals and output a first staggered sequence of phase-expanded image signals during a first time period;
a plurality of even sampling holder circuits that receive said train of negative pixel image signals and output a second staggered sequence of phase-expanded image signals during a second time period;
a rotational circuit that receives one of said first and second staggered sequences of phase-expanded image signals during one of said first and second time periods and selectively reorders said received first and second staggered sequences of phase-expanded image signals and outputs a third staggered sequence of phase-expanded image signals;
a sampling circuit that receives said third staggered sequence of phase expanded image signals and outputs pixel driving signals to said plurality of pixel units; and
a control circuit that provides control signals to said phase expansion circuit to selectively output said first and second staggered sequences of phase expanded image signals and to said rotational circuit to selectively output said third staggered sequence of phase expanded image signals.

15. The image display device of claim 14, wherein said rotational circuit comprises a plurality of analog switches in communication with at least one of said sampling holder circuits of said phase expansion circuit and said sampling circuit.

16. The image display device of claim 14, wherein said rotational circuit comprises a plurality of analog switches in communication with each of said sampling holder circuits of said phase expansion circuit and said sampling circuit.

17. The image display device of claim 14, wherein said rotational circuit and said phase-expansion circuit comprise thin film transistors.

18. The image display device of claim 14, comprising a liquid crystal panel and wherein said plurality of pixel units are imbedded in a display area of said liquid crystal panel, and wherein each pixel unit comprises a thin film transistor and two picture element electrodes sandwiching liquid crystal.

19. The image display device of claim 14, comprising a projection-type display, said projection-type display comprising a transmission-type liquid crystal panel and a light source for projection, and wherein said sampling circuit supplies said pixel driving signals to a data-side drive area of said transmission-type liquid crystal panel.

20. A method of operating an image display device having a plurality of pixels spatially arranged in a matrix, comprising the steps of:
receiving a serial train of pixel image signals;
phase-expanding said received pixel image signals by generating a first staggered sequence of phase-expanded image signals during a first time period and a second staggered sequence of phase-expanded image signals during a second time period;
receiving one of said first and second staggered sequences during one of said first and second time periods and selectively reordering the received staggered sequence and generating a third staggered sequence of phase-expanded image signals;
receiving said third staggered sequence of phase-expanded image signals, generating pixel driving signals in response thereto, and transferring said pixel driving signals to said pixel matrix; and
controlling selection of the time period during which said first, second and third staggered sequences of phase-expanded image signals are generated.

21. The image display of claim 20, wherein said controlled selection of the time period is according to a progressive circular succession of staggered sequences.

22. The image display of claim 20, wherein said controlled selection of the time period is according to a random circular succession of staggered sequences.

23. The image display of claim 20, wherein said controlled selection of the time period is according to horizontal synchronization of a display including said pixel matrix.

24. The image display of claim 20, wherein said controlled selection of the time period is according to horizontal and vertical synchronization of a display including said pixel matrix.

25. An image display device comprising:
a plurality of pixel units spatially arranged in a matrix;
a phase expansion circuit comprising a plurality of sampling holder circuits that receive a serial train of image signals and output a plurality of staggered sequences of phase-expanded image signals in a certain order;
a rotational circuit that receives said plurality of staggered sequences of phase-expanded image signals and selectively reorders said received plurality of staggered sequences of phase-expanded image signals and outputs a reordered staggered sequence of phase-expanded image signals;
a sampling circuit that receives said reordered staggered sequence of phase expanded image signals and outputs pixel driving signals to said plurality of pixel units; and
a control circuit that provides control signals to said phase expansion circuit to selectively output said plurality of staggered sequences of phase expanded image signals and to said rotational circuit to selectively output said reordered staggered sequence of phase expanded image signals.

* * * * *

UNITED STATES PATENT AND TRADEMARK OFFICE
CERTIFICATE OF CORRECTION

PATENT NO. : 5,973,661
DATED : October 26, 1999
INVENTOR(S) : Mamoru Kobayashi, et al.

It is certified that error appears in the above-identified patent and that said Letters Patent is hereby corrected as shown below:

Column 12, line 55, insert --device-- after "image display".

Signed and Sealed this

First Day of August, 2000

*Attest:*

Q. TODD DICKINSON

*Attesting Officer*     *Director of Patents and Trademarks*